July 14, 1942.          F. C. RANKIN          2,289,933
                     TIRE TREAD FABRICATION
               Filed May 9, 1941        3 Sheets-Sheet 1

Floyd C. Rankin.
INVENTOR

BY Victor J. Evans & Co.
ATTORNEYS

July 14, 1942.  F. C. RANKIN  2,289,933

TIRE TREAD FABRICATION

Filed May 9, 1941  3 Sheets—Sheet 2

Floyd C. Rankin, INVENTOR

BY Victor J. Evans & Co.

ATTORNEYS

July 14, 1942.  F. C. RANKIN  2,289,933
TIRE TREAD FABRICATION
Filed May 9, 1941  3 Sheets-Sheet 3
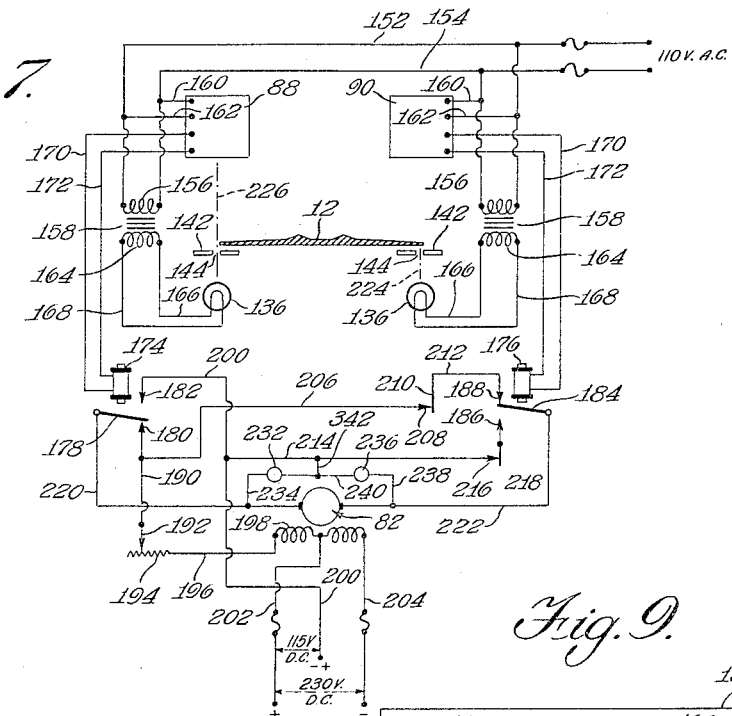
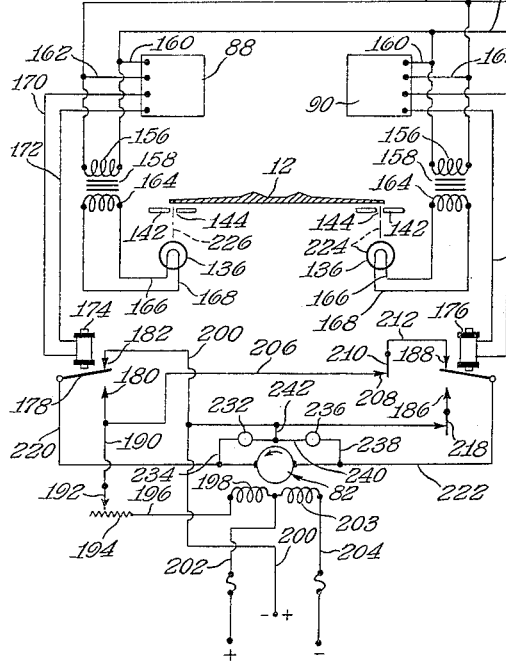
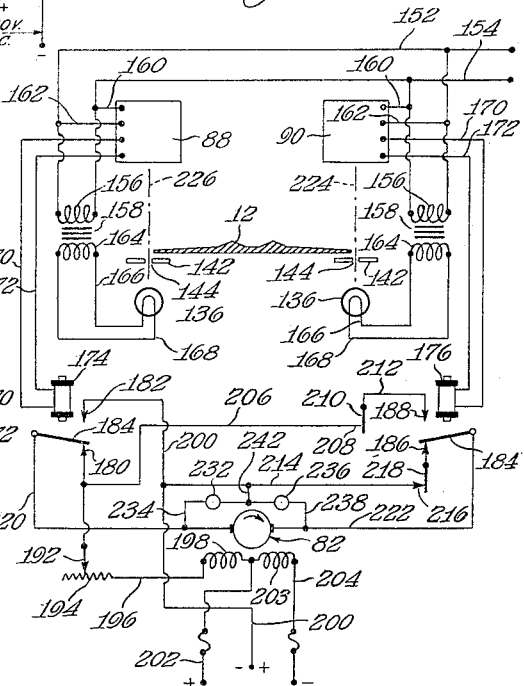
Floyd C. Rankin.
INVENTOR
BY Victor J. Evans & Co.
ATTORNEYS

UNITED STATES PATENT OFFICE 2,289,933

TIRE TREAD FABRICATION

Floyd C. Rankin, Indiana, Pa., assignor to McCreary Tire and Rubber Company, Indiana, Pa., a corporation of Pennsylvania Application May 9, 1941, Serial No. 392,801

15 Claims. (Cl. 18—2)

My invention relates to the manufacture of automotive vehicle tires, particularly the fabrication of the tread thereof, and has among its objects and advantages the provision of an improved device for maintaining uniformity of the tread with respect to size and weight.

In the manufacture of automotive vehicle tires, it is customary to employ a conveyor in the nature of an endless belt in conjunction with an extruder. The extruded tread, which is in the nature of a web, is delivered onto the conveyor belt as it comes from the extruder. Mere extrusion of the tread does not result in the necessary degree of tread uniformity, since the size and weight of the tread will vary because of variations in the speed of the tuber, rate of rubber supply to the tuber, plasticity of the rubber, temperature and many other factors. Then, too, it is necessary to maintain perfect synchronization of conveyor belt travel and extruder feeding action. Excessive speed exerts a pull on the extruded web so as to reduce its cross sectional proportions, while negative acceleration of conveyor belt speed results in excessive cross sectional proportions.

Accordingly, an object of my invention is to provide a novel photoelectric control system which operates in conjunction with an extruder and a conveyor belt in such manner as to maintain uniformity of the tread strip with respect to size and weight as it is extruded from the tuber.

A further object is to provide a photoelectric control system for regulating the speed of the conveyor as a function of slight variations in width of the continuously moving tread strip so as to secure uniformity in size and weight of the strip within predetermined limits.

Another object is to provide a photoelectric control system wherein the width measurement is made between the edges of the tread strip as it passes fixed points located between the conveyor and the extruder, which points lie in the plane of the strip and are fixed with respect to the normal direction of travel of the strip, so that the strip deposited on the conveyor is of uniform width within predetermined limits.

A further object is to provide a photoelectric control system operating in conjunction with an extruder and a conveyor belt for varying the speed of the conveyor belt as a function of slight variations in the width of the extruded strip, in which signal means are connected in circuit with the photoelectric circuit in such manner as to respond to different circuit conditions for indicating the width condition of the strip.

In the accompanying drawings:

Figure 1 is a top plan view of my invention in association with a conventional tuber, with certain parts removed for the sake of clearness;

Figure 2 is a side elevational view of the structure illustrated in Figure 1;

Figure 7 is a diagrammatic view of the electric circuit illustrating the condition of the circuit when the extruded tread strip is of proper width and rate;

Figure 8 is a diagrammatic view of the same electric circuit illustrating its condition when the extruded tread strip exceeds a predetermined width; and Figure 9 is a diagrammatic view of the same electric circuit illustrating its condition when the extruded tread strip exceeds a predetermined narrow limit.

Figure 3:
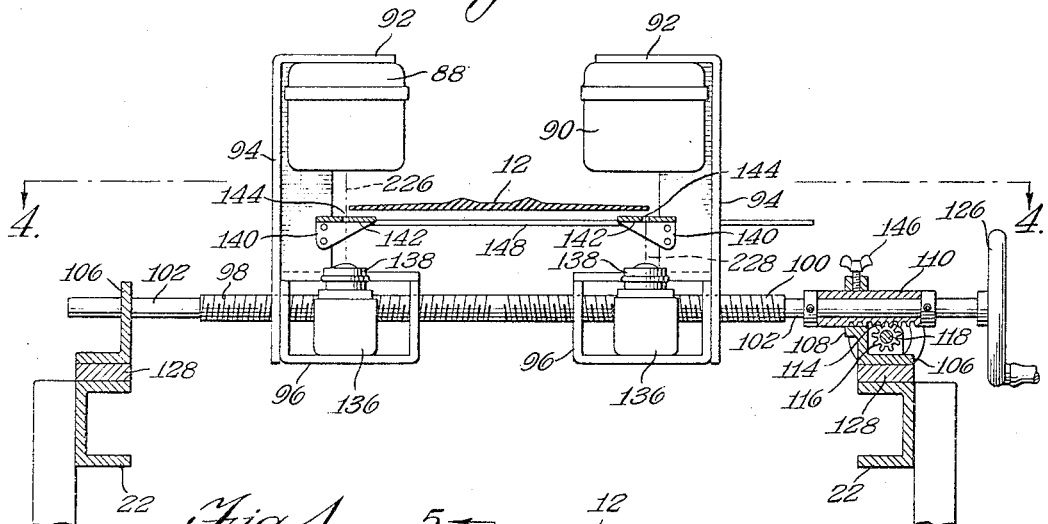
Figure 3 is a transverse sectional view of the means for adjusting the photoelectric mechanism to the desired width of the extruded tread strip and to maintain accurate alignment of the photoelectric mechanism.

In the embodiment selected to illustrate my invention, the tuber 10 is of the conventional type and is adapted to extrude a tread strip 12 onto a conveyor 14 which is of the endless belt type supported on rollers 16 and 18. Rollers 16 and 18 are mounted in bearings 20 mounted on frame members 22.

To the roller 16 is keyed a shaft 24 secured to a pulley 26 operatively connected with a pulley 28 by a belt 30. Pulley 28 is keyed to a shaft 32 journaled in bearings 34 mounted on lower frame members 36. In Figures 1 and 2, a friction wheel 38 has a hub 40 splined to the shaft 32 and has its peripheral face engaging the face of a drive wheel 42 keyed to a shaft 44. Shaft 44 has one end supported in a bearing 46 and the shaft extends through a bore in the base 48 of the tuber 10 and is provided with a pulley 50 driven by any suitable source of power (not shown). A pinion 52 is keyed to the shaft 44 and meshes with a gear 54 which operates the extrusion screw of the tuber. The details of the tuber are not shown since such devices are old and well known in the art.

Wheel 38 frictionally engages the face of the wheel 42 in such degree as to constitute a driving connection between the shafts 32 and 44. The position of the wheel 38 with respect to the axis of the wheel 42 determines the speed of the shaft 32, which in turn controls the speed of the conveyor 14. The speed of the conveyor for tread strip handling purposes is controlled through adjustment of the wheel 38 longitudinally of the shaft 32 and such adjustment of the wheel 38 is accomplished through oscillation of a lever 56 having one end pivotally connected at 58 with a bracket 60 secured to the frame structure of the conveyor. Figure 2 illustrates the lever 56 as having an oval-shaped loop 62 which fits loosely over the hub 40 of the wheel 38, and the hub is provided with a circumferential groove 64 for the reception of pins 66 carried by the loop 62.

The free end of the lever 56 is fashioned with two spaced fingers 68 between which is loosely positioned a body 70 threaded on a shaft 72 rotatable in bearings 74 mounted on the lower frame members 36. Shaft 72 is restrained against endwise movement and has a grooved wheel 76 keyed thereto for connection with a V-belt 78 passing over a grooved wheel 80 driven by the control motor 82.

Figure 1 illustrates one of the fingers 68 as being provided with a slot 84, and each finger is similarly fashioned for the reception of a pin 86 secured to the body 70. It will thus be seen that rotation of the shaft 72 causes the body 70 to move longitudinally of the shaft, since the body is square and fits between the fingers 68 in such manner as to be restrained from rotation with the shaft. Accordingly, movement of the body 70 longitudinally of the shaft 72 imparts oscillatory motion to the lever 56 which in turn shifts the wheel 38 relatively to the drive wheel 42 so as to change the speed of the conveyor. Since the motor 82 may be reversed, shaft 72 is selectively rotated in either direction so as to increase or decrease the speed of the conveyor in conformity with variations in the tread strip.

Figure 4:
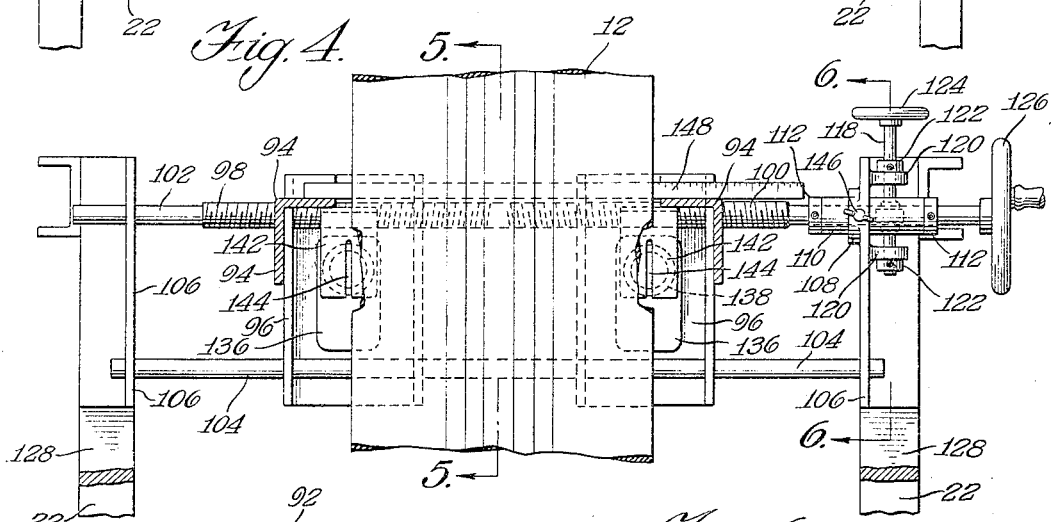
Figure 4 is a view taken from the position indicated by line 4—4 of Figure 3.
Figure 5:
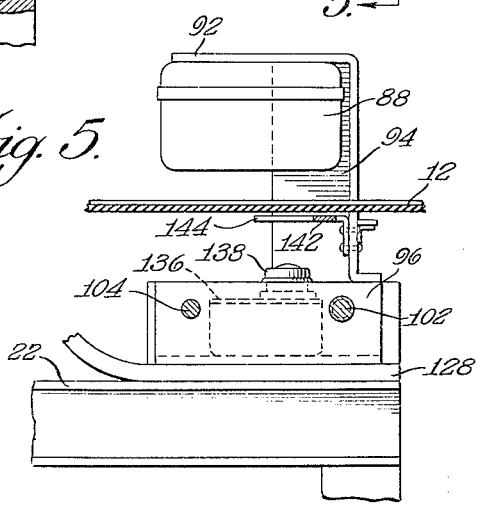
Figure 5 is a sectional view along the line 5—5 of Figure 4.
Figure 6:
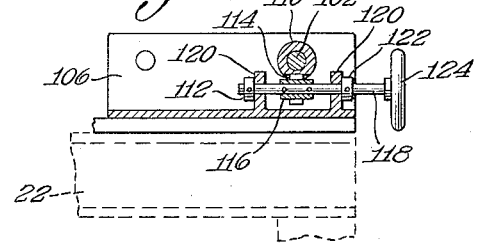
Figure 6 is a sectional view along the line 6—6 of Figure 4.

Figures 1 and 2 illustrate two photoelectric relay devices 88 and 90 located in the plane above the tread strip 12. The devices 88 and 90 are secured to plates 92 fashioned at the upper ends of upright angles 94, see Figures 3 and 4. Figure 4 illustrates each angle 94 as being secured to a channel 96. The angles may be welded to the channels and the latter lie horizontally in a common plane. The channels are provided with threaded bores for threaded connection with left and right hand threads 98 and 100 formed on a shaft 102. A shaft 104 also extends loosely through openings in the channels 96 and coacts with the shaft 102 to support the channels in a common horizontal plane so that the angles 94 will maintain true upright positions, notwithstanding the fact that the angles may be variably spaced through rotation of the shaft 102, with the channels 96 sliding freely on the shaft 104.

Figure 4 illustrates the ends of the shaft 104 as being supported by angles 106 mounted on the frame members 22, and one end of the shaft 102 is rotatably journaled in one of the angles 106 but the other angle is provided with a bearing sleeve 108 which slidably supports a sleeve 110 mounted on the shaft 102 and restrained from relative endwise movement by reason of collars 112. In Figure 3, the sleeve 110 is provided with a rack 114 which meshes with a pinion 116 keyed to a shaft 118, which shaft is rotatably journaled in lugs 120 fixed to the adjacent angle 106, see Figure 4. Collars 122 are secured to the shaft 118 to secure the latter against relative endwise movement with respect to the lugs 120, but the shaft may be rotated manually through the medium of a handwheel 124. Thus rotation of the shaft 118 imparts endwise motion to the shaft 102 so that the two photoelectric relay devices 88 and 90 may be moved transversely of the conveyor 14. The devices 88 and 90 are shifted as a unit through rotation of the shaft 118. To vary the spacing between the two devices 88 and 90, it is necessary only to rotate the shaft 102, which rotation is facilitated through the medium of a handwheel 126 secured to the shaft.

In Figures 1 and 2, the angles 106 are secured to bars 128 which rest on the upper frame members 22, and the angles 106 may be welded to their respective bars. The bars are looped at 130 to clear the bearings 20 which support the roller 18, and the bars are pivotally connected at 132 with brackets 134 bolted to the upper frame members 22. During normal operation of the device, the bars 128 will rest on the upper frame members 22, as illustrated in full lines in Figure 2, but the bars may be moved to the dotted line position illustrated to position the photoelectric relay devices 88 and 90 to one side, as when the tuber head of the tuber 10 is being removed.

Each of the channels 96 supports a light source 136, see Figure 3. Each light source is provided with a lens 138 designed to produce a concentrated beam of high light intensity onto the sensitive element of the phototube of its respective photoelectric relay device. The light sources 136 and the photoelectric relay devices 88 and 90 are old and well known in the art and need not be described in further detail. However, a bracket 140 is bolted to each of the angles 94, and each bracket includes a plate 142 positioned horizontally slightly beneath the tread strip 12, with the two plates 142 lying in a common plane and each provided with a slot 144 for the passage of light from its respective light source 136. Since the light sources 136 are fixedly secured to the channels 96, the light sources, the plates 142 and the photoelectric relay devices 88 and 90 are grouped in two separate and independent units and each unit may be adjusted relatively to the other or both units may be shifted simultaneously. The distance between the slots 144 determines the width of the tread strip 12. When once the spacing between the slots 144 has been determined, the shaft 102 is secured against accidental rotation through the medium of a set screw 146 which is threaded into the sleeve 108 for engagement with the sleeve 110, see Figure 3.

To one of the angles 94 is secured a scale 148 which extends underneath the tread strip 12 and across a corresponding point on the other angle 94. Since the scale 148 is secured to only one of the angles 94, one edge of the other angle may be utilized as an index so that the spacing between the slots 144 may be determined by checking the divisions on the scale against this edge.

Figure 7 illustrates the electric circuit associated with the photoelectric relay devices 88 and 90 and the light sources 136, as well as the relation between the tread strip 12 and the slots 144 in the plates 142 when the tread strip 12 is of proper width and weight. The line wires 152 and 154 connect with the primary windings 156 of transformers 158 as well as with the photoelectric relay devices 88 and 90 through the medium of wires 160 and 162. The secondary windings 164 of the transformers 158 connect with the light sources 136 through the medium of wires 166 and 168.

Wires 170 and 172 lead from the photoelectric relay devices 88 and 90 to electromagnets 174 and 176, respectively. An armature switch 178 is associated with the electromagnet 174 for selective engagement with contacts 180 and 182. Figure 7 illustrates the switch 178 as engaging the contact 180 and the switch may be moved into engagement with the contact 182 when the electromagnet 174 is energized to attract the switch. An armature switch 184 is associated with the electromagnet 176 for selective engagement with contacts 186 and 188. Figure 7 illustrates the switch 184 engaging the contact 188 so that the electromagnet 176 is illustrated in an energized condition. To the contact 180 is connected a wire 190 which connects with the sliding contact 192 of a rheostat 194 connected with a wire 196 connected with the series field 198 of the control motor 82. Contact 182 connects with a current supply line 200, and the series field 198 is connected with a current supply wire 202, with the lines 200 and 202 supplying a direct current voltage of 115 volts. The shunt field 203 is connected with a third wire 204, with the lines 202 and 204 supplying a direct current voltage of 230 volts. The double voltage supply for the control motor 82 gives a greater range of speed than is obtainable by either armature or field rheostat control devices.

A wire 206 connects the wire 190 with a contact 208 of a limit switch 210 connected with a wire 212 leading to the contact 188. A wire 214 connects the wire 200 with a contact 216 and a limit switch 218 connected with the contact 186. Switch 178 connects with a wire 220 leading to the motor 82, and a wire 222 leads from the motor 82 to the switch 184.

A red lamp 232 is electrically connected with the wire 220 by a wire 234, and a green lamp 236 is electrically connected with the wire 222 by a wire 238. A wire 240 is electrically connected with the lamps 232 and 236 and with the wire 214, as at 242.

In operation, the handwheel 126 of Figures 3 and 4 is turned to position the photoelectric relay devices 88 and 90 a predetermined distance apart for a particular tread. The handwheel 124 is then adjusted to shift the photoelectric relay devices as a unit about 1/16 of an inch laterally of the tread strip 12. Figures 3 and 4 illustrate the degree of lateral shift, which shift is to the left with respect to the tread strip. With the tread strip running in proper width and weight, the light beam 224 is interrupted by reason of the fact that the tread strip 12 covers the slot 144 in the plate 142 associated with the photoelectric relay device 90. However, the slot 144 in the plate 142 associated with the photoelectric relay device 88 is uncovered so that the light beam 226 is projected onto the phototube of the device 88. According to Figure 7, the electromagnet 174 is deenergized through projection of the light beam 226 onto the phototube of the device 88 so that the switch 178 remains in engagement with the contact 180. At the same time, interruption of the light beam 224 causes the electromagnet 176 to become energized for attracting the switch 184 into electrical engagement with the contact 188. With the switches 178 and 184 positioned according to Figure 7, the control motor 82 is inactive so that the conveyor belt 14 of Figures 1 and 2, which carries the tread strip 12, will move at a constant speed.

With the photoelectric circuit in the condition of Figure 7, both lamps 232 and 236 are illuminated for visually indicating that the tread strip 12 is of proper width. Under the conditions of Figure 7, the slots 144 are off centered to the left of the edges of the tread strip at which time the switch 178 is in engagement with the contact 180 and the switch 184 is in engagement with the contact 188. Both lamps also remain illuminated in cases where the slots 144 are off center to the right, at which time the switch 184 is in engagement with the contact 186 and the switch 178 is in engagement with the contact 182.

Should the tread strip 12 become wider in an undesirable degree, the strip will interrupt the light beam 226, as illustrated in Figure 8, so that both electromagnets 174 and 176 will be energized. The switch 178 will then engage the contact 182 and the switch 184 continues its engagement with the contact 188. Under such conditions, the current in the control motor armature circuit will flow as follows: wires 202, 196, rheostat 194, wire 190, wire 206, limit switch 210, wire 212, contact 188, switch 184, wire 222, wire 220, switch 178, and wire 200. Such flow of the current will rotate the control motor 82 in the direction which causes the wheel 38 of Figure 1 to shift outwardly from the axis of the wheel 42 so that the speed of the conveyor belt 14 will be accelerated to bring the tread strip 12 back to proper width, thus causing the control motor to stop.

With the circuit conditioned according to Figure 8, the green lamp 236 only is illuminated for indicating that the strip 12 is of excessive width.

Should the tread strip 12 become too narrow, neither light beam 224 or 226 is interrupted which causes deenergization of both electromagnets 174 and 176. Accordingly, the switch 178 will electrically engage the contact 180 and the switch 184 will electrically engage the contact 186. At this time, the current in the control motor armature circuit will flow as follows: Wires 202, 196, rheostat 194, wire 190, switch 178, wire 220, wire 222, switch 184, contact 186, limit switch 218, wire 214, and wire 200. Thus the motor 82 will rotate in a reverse direction for decelerating the speed of the conveyor belt 14 so as to bring the tread strip 12 back to proper width. As soon as the tread strip 12 is brought back to proper width, the control motor is again stopped so that the conveyor belt 14 will again run at a new constant speed.

With the photoelectric circuit conditioned according to Figure 9, the red lamp 232 only is illuminated for indicating that the tread strip 12 is too narrow. The two signal lamps 232 and 236 are also useful in adjusting the handwheel 124 to indicate which way and how much the photoelectric relay devices are shifted laterally with respect to the said strip 12.

In Figure 1, the limit switches 210 and 218 are each provided with a finger 228 arranged in the path of a pin 230 secured to the fingers 68, see Figure 2. The two limit switches 210 and 218 are provided so that the proper part of the control motor armature circuit will be opened if the control motor tends to shift the wheel 38 too far in either direction, but opening of either limit switch does not impair the other limit switch so that the control motor may be operated to shift the wheel 38 in the opposite direction.

I claim:

1. In a device of the type described: The combination of a traveling conveyor; means for forming a web of plastic material and delivering the web onto said conveyor; a variable-speed drive for said conveyor; a control motor operatively connected with said variable-speed drive; and light sensitive means electrically connected with said control motor and controlled through increased or decreased width of said web for respectively increasing or decreasing the speed of said variable-speed drive to maintain uniformity in width and weight of the web.

2. In a tire tread fabrication system: The combination of a traveling conveyor; and extruder for extruding a plastic tire tread web onto said conveyor; an adjustable-speed drive for said conveyor; a control motor operatively connected with said adjustable-speed drive; and an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web.

3. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; and an electromagnet electricity connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction.

4. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; and an electromagnet electrically connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction; said two circuits being so interconnected one with the other and with said switches as to break both circuits of the motor when said one light beam is normally interrupted.

5. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; an electromagnet electrically connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction; and limit switchs interposed in said two circuits for breaking the respective circuits when said adjustable-speed drive is adjusted to a predetermined high or low conveyor speed position.

6. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; an electromagnet electrically connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction; connector means for fixedly connecting each of said photoelectric relay devices with its respective light source and barrier; and adjusting means acting on said connector means for increasing or decreasing the distance between the light sources and their respective photoelectric relay devices and barriers.

7. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; an electromagnet electrically connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction; connector means for fixedly connecting each of said photoelectric relay devices with its respective light source and barrier; adjusting means acting on said connector means for increasing or decreasing the distance between the light sources and their respective photoelectric relay devices and barriers; and means acting on said adjusting means for moving the two light sources and their respective photoelectric relay devices and barriers as a unit transversely of said web.

8. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; an electromagnet electrically connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction; connector means for fixedly connecting each of said photoelectric relay devices with its respective light source and barrier; adjusting means acting on said connector means for increasing or decreasing the distance between the light sources and their respective photoelectric relay devices and barriers; means acting on said adjusting means for moving the two light sources and their respective photoelectric relay devices and barriers as a unit transversely of said web; said adjusting means including a screw having reverse threads respectively threaded in said connector means; a shaft guiding said connector means; and pivotal mounts for said screw and shaft to pivot said light sources and their respective photoelectric relay devices and barriers to positions remote from said extruder.

9. In a device of the type described: The combination of a traveling conveyor; means for forming a web of plastic material and delivering the web onto said conveyor; a drive means for said conveyor having a variable-speed device interposed therein; a control motor for actuating said variable-speed device; and light sensitive means electrically connected with said motor and controlled through increased or decreased width of said web for respectively increasing or decreasing the speed of said conveyor to maintain uniformity in width and weight of the web; said variable-speed device comprising a rotative member having a friction face and a wheel having its peripheral surface frictionally engaging said friction face to be driven thereby and movable toward or away from the axis of said rotative member.

10. In a device of the type described: The combination of a traveling conveyor; means for forming a web of plastic material and delivering the latter onto said conveyor; a drive means for said conveyor having a variable-speed device interposed therein; a control motor for actuating said variable-speed device; and light sensitive means electrically connected with said motor and controlled through increased or decreased width of said web for respectively increasing or decreasing the speed of said conveyor to maintain uniformity in width and weight of the web; said variable-speed device comprising a rotative member having a friction face and a wheel having its peripheral surface frictionally engaging said friction face to be driven thereby and movable toward or away from the axis of said rotative member; said wheel having its axis of rotation arranged at right angles to the axis of rotation of said driven member.

11. In a device of the type described: The combination of a traveling conveyor; means for forming a web of plastic material and delivering the latter onto said conveyor; a drive means for said conveyor having a variable-speed device interposed therein; a control motor for actuating said variable-speed device; light sensitive means electrically connected with said motor and controlled through increased or decreased width of said web for respectively increasing or decreasing the speed of said conveyor to maintain uniformity in width and weight of the web; said variable-speed device comprising a rotative member having a friction face and a wheel having its peripheral surface frictionally engaging said friction face to be driven thereby and movable toward or away from the axis of said rotative member; said wheel being splined to a shaft having a driving connection with said conveyor but keyed to the shaft for rotation therewith; a lever connected with said wheel for moving the latter longitudinally of said shaft; a screw threadedly connected with said lever for moving the latter through rotation of the screw; and a driving connection between said motor and said screw.

12. In a device of the type described: The combination of a traveling conveyor; means for forming a web of plastic material and delivering the latter onto said conveyor; a drive means for said conveyor having a variable-speed device interposed therein; a screw means for adjusting said variable-speed device; a control motor operatively connected with said screw means for turning the same in either direction for adjusting the variable-speed device to an increased or decreased conveyor speed position; a pair of photoelectric relay devices; a light source for each photoelectric relay device; a light barrier between each light source and its respective photoelectric relay device and having a slot for the passage of a light beam; said web passing over said barriers and normally interrupting one light beam; circuits for said motor to rotate the motor in two directions; each circuit including first and second contacts and a switch adapted to electrically engage either contact; an electromagnet electrically connected with each photoelectric relay device for actuating one of said switches; said electromagnets being energized through interruption of said light beams to move said switches into engagement with said first contacts to close one circuit of the motor; said electromagnets being deenergized through projection of the light beams to their respective photoelectric relay devices to cause engagement between said switches and said second contacts to close the second circuit of the motor for rotating the latter in a reverse direction; connector means for fixedly connecting each of said photoelectric relay devices with its respective light source and barrier; adjusting means acting on said connector means for increasing or decreasing the distance between the light sources and their respective photoelectric relay devices and barriers; means acting on said adjusting means for moving the two light sources and the respective photoelectric relay devices and barriers as a unit transversely of said web; said adjusting means including a screw having reverse threads respectively threaded in said connector means; a shaft for guiding said connector means; and mounts for said screw and shaft for pivoting the same and said light sources and their respective photoelectric relay devices and barriers to positions remote from said first-mentioned means.

13. The method which comprises forming a web of plastic material; continuously feeding the web onto a moving conveyor; and utilizing the width of said web to control a light sensitive speed control for the conveyor to respectively increase or decrease the conveyor speed upon increased or decreased width of the web to maintain uniformity in width and weight thereof.

14. In a tire tread fabrication system: The combination of a traveling conveyor; an extruder for extruding a plastic tire tread web onto said conveyor; an adjustable-speed drive for said conveyor; a control motor operatively connected with said adjustable-speed drive; an electrical circuit means connected with said control motor, including means for producing light beams coacting with the edges of said web for controlling the supply of current to said control motor in accordance with increased or decreased width of said web for respectively increasing or decreasing the speed of said adjustable-speed drive to maintain uniformity in the width of said web; said second-mentioned means comprising a pair of photoelectric relay devices, a light source for each photoelectric relay device, and a light barrier between each light source and its respective photoelectric relay device and having a slot for the passage of a light beam; said web passing over said barriers and normally interrupting one light beam; said electrical circuit means comprising two circuits, each including first and second contacts and a switch adapted to electrically and selectively engage either contact; an electromagnet electrically connected with each photoelectric relay device for actuating one of said switches; said electromagnets being energized through interruption of said light beams to move said switches into engagement with said first contacts to close one circuit of the motor to rotate the motor in a predetermined direction; said electromagnets being deenergized through projection of the light beams onto their respective photoelectric relay devices to cause engagement between said switches and said second contacts to close the second circuit of the motor for rotating the motor in a reverse direction; and signals electrically connected in said circuits for respectively indicating excessively wide and narrow web dimensions.

15. The combination of a traveling conveyor, an extruder for extruding a plastic web onto said conveyor, an adjustable-speed device for the conveyor, a motor for actuating the said adjustable-speed device, and a photoelectric circuit operatively connected with said motor and controlled by the edges of said web for energizing the motor when said web exceeds predetermined wide and narrow limits to respectively increase and decrease the speed of the conveyor and to deenergize the motor when said web is of proper width.

FLOYD C. RANKIN.